Feb. 10, 1925.
F. E. WELLMAN
1,525,762
FLOAT SYSTEM FOR HIGH PRESSURE STILLS
Original Filed March 8, 1922
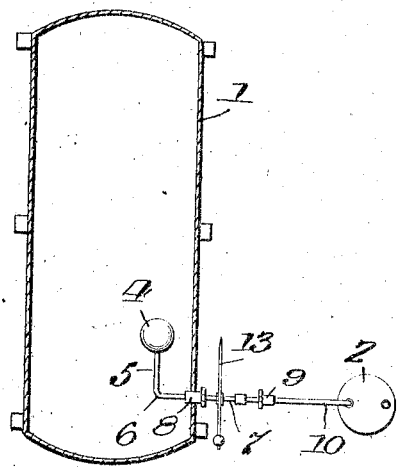
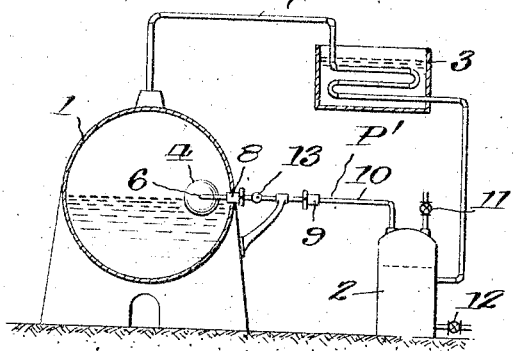
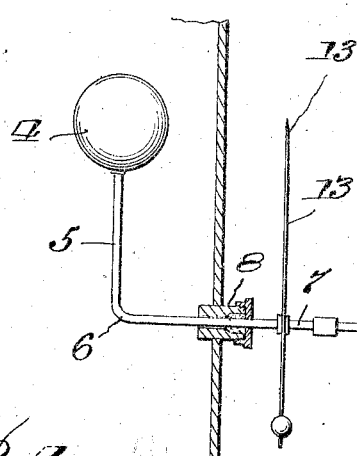
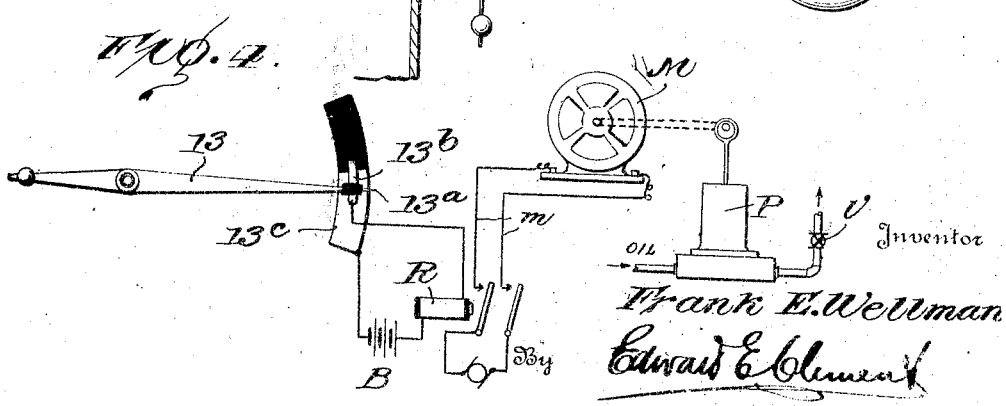
Inventor
Frank E. Wellman
By Edward E. Clement
Attorney Patented Feb. 10, 1925.

1,525,762

UNITED STATES PATENT OFFICE.

FRANK E. WELLMAN, OF KANSAS CITY, KANSAS, ASSIGNOR TO THE KANSAS CITY GASOLINE COMPANY, OF KANSAS CITY, KANSAS, A CORPORATION OF KANSAS.

FLOAT SYSTEM FOR HIGH-PRESSURE STILLS.

Application filed March 8, 1922, Serial No. 542,154. Renewed July 3, 1924.

*To all whom it may concern:*

Be it known that I, FRANK E. WELLMAN, a citizen of the United States, residing at Kansas City, in the county Wyandotte and the State of Kansas, have invented certain new and useful Improvements in Float Systems for High-Pressure Stills, of which the following is a specification, reference being had therein to the accompanying drawing.

My invention relates to means for indicating the level of oil and for regulating the supply in and to pressure stills. It has for its object the provision of a float as the essential working element of the system, in combination with means for preventing the collapse of said float under all conditions of pressure in the still.

Most pressure stills when operated, are put under pressure before the fire is applied by pumping in gas which has been created by another battery of cracking stills previously in operation. Obviously, if a float is employed, the external pressure upon it must be balanced in some way in order to prevent collapsing. In low pressure apparatus such as steam boilers, liquid tanks, and the like, simple means may be adapted to maintain an equality of pressure within and without a liquid level float as shown for example in U. S. Letters Patent Number 227,145 issued May 4, 1880 to Amundsen. Such means fail, however, under the exacting condition found in high pressure work, and especially in oil stills, where a small fractional difference or inequality between inside and outside pressure may run to many pounds to the inch, quite sufficient to collapse the strongest float that can be made bouyant.

In order to attain my object, I have found it necessary to control the pressure within the float from the outside of the still, and to close the float entirely with respect to the contents of the still, both gas and oil.

This enables me to produce an exact balance, to insure the absence of oil from the interior of the float with attendant sensitiveness and to obtain direct reading whenever desired on the internal as well as the external pressures. The mechanical elements by which I attain these ends include a rotary tubular shaft passing horizontally through a stuffing box in the still wall, with its inner end bent at right angles and carrying the float, and its outer end connected through a pressure-tight swivel joint to a gas receiver in which pressure may be maintained through the condenser from the same still, as shown, or from another still or battery of stills or by mechanical means such as a compressor. The fluid-level indicator is mounted on or connected to the float shaft between the stuffing box and the swivel joint, and feed controlling mechanism for automatically regulating the supply of fresh oil may be actuated from the same portion of the shaft as the indicator.

My invention is illustrated in the accompanying drawings, in which:

Figure 1 is a horizontal diagrammatic section of a still with my float apparatus attached thereto.

Figure 2 is a diagrammatic end view with parts in section.

Figure 3 is a diagrammatic view on an enlarged scale showing the float and connected parts.

Figure 4 is a circuit diagram showing a simple scheme for valve opening and pumping means controlled by the float.

In the drawings 1 indicates the still, 2 a gas receiver or pressure tank, connected to the still through a condenser 3, and 4 the float, carried on a tubular shaft 5 bent at right angles at 6 with its horizontal arm 7 passing through a stuffing box 8 in the still wall and terminating in a packed swivel joint 9 from which a fixed tube 10 passes to the gas receiver. Details of pressure valves etc. are omitted for simplicity. It is to be understood that standard practice is followed as to all these parts. Thus, the still has the usual manholes, feed pipe, take off pipes, valves, etc. and the several pipes to and from the still and the gas receiver may have any desired system of valves. The essential feature for my present purpose is that the pressures in the still, or equivalent pressures supplied from without, are supplied through the tubular shaft 5 to the interior of the float, and that the means employed for this purpose as well as the controlling parts therefor, all lie outside the still where they are accessible. Valves are indicated at 11 and 12 for the gas outlet and the liquid outlet respectively of the gas receiver 2. The dotted line shown on the gas receiver 2 indicates the liquid level and the gas from the still which has passed through the condenser 3 enters the gas receiver below the liquid level, as shown.

In Figure 3, the float and its connected parts are shown in side view, with an indicator hand 13 attached to the tubular shaft 7 between the stuffing box 8 and the swivel joint 9. This arm as better shown in Fig. 4, sweeps round in an arc, and may conveniently lie parallel with the inner tubular arm 5, with its tip 13ᵃ opposite the center of the float 4, so that the exact position of the float and therefore of the oil level may be directly indicated at all times by the tip 13ᵃ.

In Figure 4 the arm 13 is shown carrying a light metal brush 13ᵇ, which sweeps over a metal contact arc 13ᶜ. This may be adjustable if desired, so that the limits within which the oil level will be kept may be correspondingly adjusted.

The contact 13ᶜ is connected by circuit wires to relay R and a source of current B. The relay controls the working circuit m of motor M, which may control a feed pump, delivering oil into the still through a check valve, or equivalent mechanism. Any standard arrangement of pressure feed may be used, my invention being in this case limited to the float and its combination with the other elements described. In operation, as shown in Fig. 4, the fall of the oil level brings about the closing of the circuit 13ᵇ, 13ᶜ, R, B, which energizes relay R, and closes circuit m of motor M, which actuates pump P to force fresh oil into the still through check valve V. When the proper level is reached, the contacts 13ᵇ and 13ᶜ separate, the circuits are broken and pumping ceases.

In practice I may use one or more pressure gauges or manometers in the pipes between the still and the float for indication of the balanced pressures, as for example at P—P'.

What I claim is:

1. A float system for high pressure oil stills and the like comprising a hollow float within the still, a tubular shaft arm carrying said float and passing through a wall of the still, and means outside of the still to communicate pressure through said shaft arm to the interior of the float.

2. A float system for high pressure oil stills and the like comprising a hollow float within the still, a tubular shaft arm carrying said float and passing through a wall of the still, and means to supply pressure from without the still through said shaft arm to the interior of the float, together with means to maintain said pressure equal to the pressure in the still.

3. A float system for high pressure oil stills comprising a hollow float within the still, a tubular shaft arm carrying said float, and passing through a wall of the still, and means for communicating pressure from within the still to said tubular shaft on the outside of the still and through said shaft to the interior of the float.

4. A float system for indicating and controlling the oil level in high pressure stills which comprises a hollow float within the still, a bent tubular arm carrying the float and having a shaft member passing through and journalled in a wall of the still, a pressure tank without the still, a fixed tubular connection between said tank and the outside end of the float shaft, and means for communicating pressure from the interior of the still to said pressure tank.

In testimony whereof I affix my signature.

FRANK E. WELLMAN.